Figure 1:
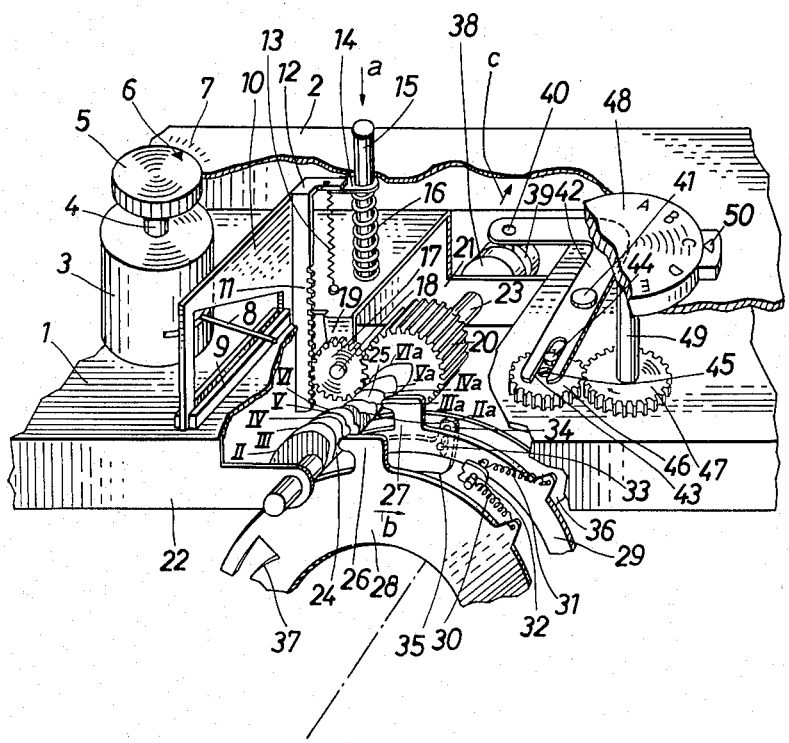

March 31, 1964   F. JAKOB ETAL   3,126,802
ADJUSTABLE AUTOMATIC EXPOSURE CONTROL STRUCTURE FOR CAMERAS
Filed Nov. 23, 1962   3 Sheets-Sheet 1

INVENTOR.
FRANZ JAKOB
FRIEDRICH OSTERTAG
BY
Michael S. Strike
Attorney

March 31, 1964 F. JAKOB ETAL 3,126,802
ADJUSTABLE AUTOMATIC EXPOSURE CONTROL STRUCTURE FOR CAMERAS
Filed Nov. 23, 1962 3 Sheets-Sheet 3
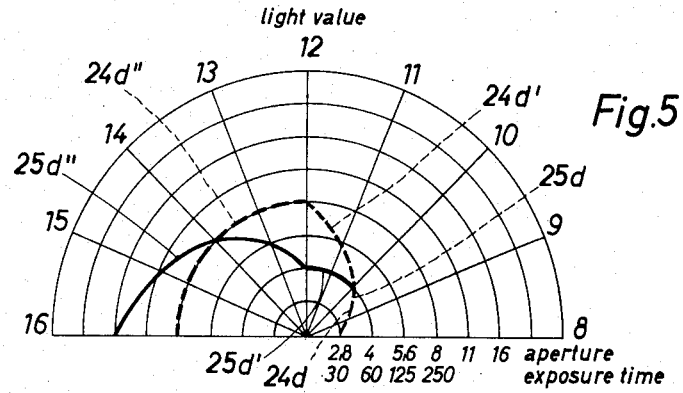
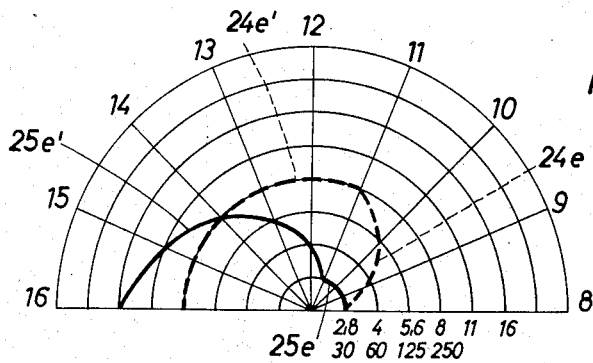
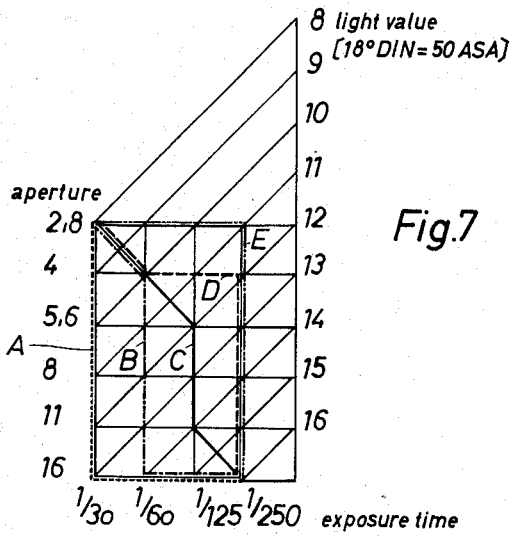
INVENTOR.
FRANZ JAKOB
FRIEDRICH OSTERTAG
BY
Michael S. Striker
Attorney United States Patent Office 3,126,802
Patented Mar. 31, 1964

3,126,802
ADJUSTABLE AUTOMATIC EXPOSURE CONTROL STRUCTURE FOR CAMERAS
Franz Jakob and Friedrich Ostertag, Unterhaching, near Munich, Germany, assignors to Agfa Aktiengesellschaft, Leverkusen, Germany
Filed Nov. 23, 1962, Ser. No. 239,574
Claims priority, application Germany Nov. 25, 1961
10 Claims. (Cl. 95—10)

The present invention relates to cameras.

More particularly, the present invention relates to automatic cameras which are automatic in the sense that they are capable of automatically setting the exposure time and aperture in accordance with the lighting conditions, and of course at settings which will be proper for the speed of the particular film which is used in the camera.

Although cameras of this general type are well known, most of them will provide only a single program of exposure times and exposure apertures. In other words, for a given light intensity there will be only one exposure time and one exposure aperture. Thus, when a camera of this type is set at a given light value there will be a given combination of exposure time and exposure aperture for the particular light value, and this combination cannot be changed. It has already been recognized that a single program of exposure time and exposure apertures represents a serious limitation, and it has already been proposed to provide more than one combination of exposure times and apertures so that the operator can make a selection of a given program of exposure times and apertures which will be suited to the particular conditions under which the photograph is being made. However, at the present time where such a selection is possible the selection can only be made from among two or three programs, so that even with such cameras there is still a considerable limitation on the combinations of exposure time and aperture available to set the camera in accordance with given lighting conditions.

A primary object of the present invention is to provide an automatic camera of the above type, capable of automatically setting the exposure time and aperture, while giving to the operator a practically unlimited selection of programs of exposure time and aperture.

It is furthermore an object of the present invention to provide a camera which is automatic and which will have an almost unlimited selection of programs of exposure time and aperture while at the same time being extremely simple in its construction.

It is also an object of the present invention to provide a camera of the above type which is exceedingly simple to operate so that one need not memorize complicated instructions or the like in order to learn how to operate the camera properly.

With the objects in view the invention includes, in a camera, a pair of three-dimensional cam means and an exposure time setting means as well as an aperture setting means which are respectively actuated by the pair of three-dimensional cam means. A support means support the pair of three-dimensional cam means for movement in two different directions, and an automatic light-responsive means is operatively connected to the pair of cam means for moving them in one of these directions in accordance with the lighting conditions. A manually operable setting means is operatively connected to the pair of cam means for moving them in the other of the directions to a position representing a selected program of exposure times and apertures.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a perspective illustration of one possible embodiment of a structure according to the present invention, the camera which carries the structure of the invention being fragmentarily illustrated in FIG. 1, and certain parts being broken away to clearly illustrate the structure of the invention;

FIGS. 2–6 illustrate diagrammatically the construction of a pair of cams of the invention, FIGS. 2–6 showing the cam configurations in different planes, respectively, and FIGS. 2–6 also diagrammatically illustrating the different settings which will be provided by the pair of cams in various positions thereof; and FIG. 7 diagrammatically illustrates five different programs of exposure time and aperture which can be provided with the structure of the present invention.

Referring to FIG. 1, it will be seen that the structure of the invention is located for the most part between the upper wall 1 of the camera housing and the hollow cap 2 which is mounted on the upper wall 1 of the camera housing and defines therewith an enclosure in which various camera parts such as the view finder, and the like, are conventionally located. As may be seen from FIG. 1, there is mounted within the enclosure defined between the wall 1 and the hollow cap 2 a light meter 3 of conventional construction which is supported in a known way for movement about its axis which extends vertically, and in a conventional manner well known in the art the light meter 3 is connected with a photosensitive element which actuates the light meter 3 so as to position the pointer 8, which is connected to the rotor of the light meter, at positions which are indicative of the lighting conditions, as is well known in the art. A pin 4 is fixed coaxially to the housing of the light meter 3 and extends through an opening in the upper wall of the cap 2, and at the exterior of the cap 2 the pin 4 is fixed with a knob 5 so that by turning the knob 5 it is possible to adjust the angular position of the light meter 3. The knob 5 carries an index 6 which cooperates with a scale 7 of film speeds, so that in this way it is possible for the operator to place the light meter 3 at a selected angular position corresponding to the speed of the film which is used in the camera, and in this way the factor of the film speed is introduced into the automatic light-responsive means in a manner well known in the art. The automatic light-responsive means will automatically set the camera in a manner described below, and this automatic light-responsive means includes in addition to the light meter 3 a structure for sensing the position of the pointer 8 thereof. The pointer 8 is freely movable over a pair of supporting bars 9 which limit the downward deflection of the pointer 8 so as to protect the light meter, and between the pair of bars 9 there is supported for vertical movement, in a slot of the wall 1, a scanning member 10. The scanning member 10 is formed with the cutout through which the pointer 8 extends, and the downwardly directed edge of the cutout of the scanning member 10 is of such a curvature that during the downward movement of the scanning member 10, its scanning edge will engage the pointer 8 to limit the downward movement of the scanning member 10 and thus position the scanning member 10 at an elevation which will correspond to the lighting conditions, as is also well known in the art. With the illustrated structure of the invention the scanning member 10 is fixed with a rack 11 and includes a projection 12 to which one end of a spring 13 is connected, the opposite end of the spring 13 fixed to the wall 1 so that the spring 13 urges the scanning member 10 downwardly from its upper rest position shown in FIG. 1. Thus, the spring 13 urges the member 10 in a direction where the scanning edge thereof will engage the pointer 8 while pressing the latter against the protective bars 9. In the rest position of the parts which is illustrated in FIG. 1 the scanning member 10 is maintained raised from the pointer 8 so that the latter can move freely over the members 9 to whatever position is dictated by the lighting conditions. The projection 12 of the scanning member 10 is maintained by the spring 13 in engagement with a lateral projection 14 of an elongated operating rod 15 which is accessible to the operator for initiating the operations which will result in an exposure. The manually operable rod 15 is urged upwardly to the illustrated rest position by a spring 16 the top end of which engages the underside of the projection 14 and the bottom end of which engages the wall 1, and of course the spring 16 is stronger than the spring 13.

A pinion 17 meshes with the rack 11 and is supported for rotary movement by a shaft 18 which is fixedly carried by a lug 19 which is bent from a portion of the plate 1. The pinion 17 meshes with a gear 20 which is coaxially fixed to an elongated shaft 23 which is supported for rotary and axial movement by a pair of angularly bent portions 22 and 21 of the plate 1, so that in this way the plate 1 forms a support means which supports the elongated shaft 23 for rotary and axial movement.

The elongated shaft 23 fixedly carries a pair of three-dimensional cams 24 and 25, the configurations of which are described below. The cams 24 and 25 are three-dimensional in the sense that they will perform their caming actions not only when the shaft 23 is turned in a rotational direction but also when the shaft 23 is moved in an axial direction, so that the cams 24 and 25 will perform their camming actions when moved in two different directions. The exposure time of the camera is set by a rotary exposure-time-setting ring 28 which is supported for turning movement about the optical axis which passes through the center of the ring 28, and the exposure-time setting ring 28 has a projection 26 which engages the cam 24, so that this cam 24 determines the angular position of the ring 28 and thus actuates the ring to set the exposure time. Also, the camera includes a rotary aperture-setting ring 29 which also turns about the optical axis and has its center in the optical axis, and this aperture setting ring 29 will set the aperture of the diaphragm of the camera and has a projection 27 which engages the cam 25, so that this cam 25 actuates the ring 29 for setting the aperture. A pair of spring means are operatively connected to the pair of setting means 28 and 29 for maintaining their projections 26 and 27 respectively in engagement with the cams 24 and 25, and this pair of spring means takes the form of the pair of springs 30 and 31 which are respectively connected with the rings 28 and 29 and which are connected also, at their ends distant from the rings, to a stationary pin 32 which is carried by a stationary part of the camera. Thus, the springs 30 and 31 respectively seek to turn the rings 28 and 29 in a counterclockwise direction, as viewed in FIG. 1, thus maintaining the projections 26 and 27 in engagement with the cams 24 and 25, respectively. In this way the portions 26 and 27 of the rings 28 and 29 will be maintained in engagement with the cams 24 and 25 irrespective of the turning of the shaft 23. The aperture setting ring 29 carries a pin 33 which extends into a camming or control slot 34 formed in the diaphragm blade 35 which is supported for pivotal movement by a pin carried by a stationary ring 36, so that when the ring 29 turns the angular position of the diaphragm blade 35 will be adjusted, and for the sake of clarity the remaining diaphragm blades are not illustrated but they are all constructed and controlled in the same way, and thus in a manner well known in the art the exposure aperture will be determined by the angular position of the rings 29. The exposure-time-setting ring 28 is formed with an elongated cutout having a camming edge 37 which cooperates with a pin carried by a turnable lever whose angular position determines the extent to which a retarding mechanism will retard the structure which drives the shutter of the camera, so that in this way, which is also well known in the art, the angular position of the ring 28 will determine the exposure time.

Thus, with the above-described structure the light-responsive means which is formed by the light meter 3 and the scanning member 10 will through its operative connections with the shaft 23 by way of the rack 11, pinion 17, and gear 20 move the shaft 23 in the rotational direction during movement of the scanning member 10 to sense the position of the pointer 8, so that in this way the angular positions of the cams 24 and 25 are determined automatically by the light-responsive means, and of course the angular turning of the cams 24 and 25 will result in setting of the exposure time and aperture, through turning the of the rings 28 and 29, in accordance with the lighting conditions.

In accordance with the present invention, there is also provided a manually operable selecting means which is operatively connected to the shaft 23 for shifting the same in the axial direction to positions which will provide selected programs of exposure time and aperture, so that in accordance with the axial position of the shaft 23 the cams 24 and 25 will have an engagement with the projections 26 and 27 portions which will provide a given program of exposure time and aperture according to the lighting conditions sensing by the light responsive means. The operative connection of the manually operable selecting means to the shaft 23 is by way of a pair of flanges 38 and 39 which are fixed to the shaft 23 and which define between themselves a space into which a pin 40 projects, and this pin 40 is fixedly carried by a substantially L-shaped two-armed lever 42 which is supported for turning movement by a pin 41 carried by the wall 1, and at its end distant from pin 40 the lever 42 is formed with an elongated cutout 43 which receives a pin 44 which is fixed eccentrically to a rotary member in the form of a gear 46 which meshes with a gear 47 which is in turn fixed with a rotary shaft 49 which extends through the top wall of cap 2 where, at the exterior of the cap 2, the shaft 49 is fixed with a knob or handle 48. The knob 48 carries a scale of symbols A–E, the graduations of which can be positioned with respect to a stationary index 50 carried by the cap 2 at the exterior thereof. Thus, in accordance with the selected angular position of the knob 48, the gears 46 and 47 will turn the lever 42 so as to position the shaft 23 and thus the cams 24 and 25 at a corresponding axial position, and in this way the elements 38–50 form a manually operable selecting means operatively connected to the shaft 23 for moving the same axially.

At the end of its downward movement, the rod 15 can trip the shutter of the camera so as to make the exposure in a manner well known in the art. During the initial part of its downward movement, the rod 15 will move the projection 14 downwardly in opposition to the spring 16, which is compressed when the operator depresses the rod 15 in the direction of the arrow $a$, and at this time the spring 13 will contract while it pulls the scanning plate 10 downwardly until the downwardly directed scanning edge over the pointer 8 engages the latter to limit the downward movement of the scanning member 10, so that the elevation thereof will correspond to the lighting conditions, as pointed out above. Of course, during the downward movement of the scanning plate 10, the rack 11 also moves downwardly, so that the pinion 17 turns and thus turns the gear 20, and in this way the shaft 23 together with the cams 24 and 25 are angularly turned to an angular position which will be determined by the lighting conditions. The cams 24 and 25 will at this time cam the rings 28 and 29 in the direction of the arrow b, so that in this way the exposure time and aperture will be set in accordance with the lighting conditions.

Before depressing the rod 15, the operator will have turned the knob 48 to a selected angular position where one of the graduations A–E is aligned with the index 50, and during this turning of the knob 48 the gears 47 and 46 will turn the lever 42. The turning of the lever 42 will of course result in the movement of the pin 40 which will engage one or the other of the flanges 38 and 39 so as to move the shaft 23 axially either in the direction of the arrow c or in the opposite direction, and it will be noted that the shaft 23 extends parallel to the optical axis about which the rings 28 and 29 turn. The gear 20 is made long enough, in the axial direction, to remain in engagement with the pinion 17 throughout the entire range of axial adjustment of the shaft 23 which can be made by turning of the knob 48, so that irrespective of the selected axial position of the shaft 23 and thus of the cams 24 and 25, the gears 17 and 20 will remain in mesh with each other, and therefore the operative connection of the light-responsive means to the shaft 23 will not be disturbed.

Inasmuch as the rings 28 and 29, and thus their portions 26 and 27, cannot move along the optical axis, the cams 24 and 25 move axially with respect to the projections 26 and 27, and for every axial position of the cam 24 with respect to the projection 26 there is a corresponding, predetermined axial position of the cam 25 with respect to the projection 27. Because of the exterior configurations of the three-dimensional cams 24 and 25, these cams will actuate the rings 28 and 29 during axial movement of the cams, as well as during rotational movement thereof. The curvature of the cams changes continuously, and the points of engagement of the projections 26 and 27 with the cams 24 and 25 are predetermined with respect to each other not only at the five positions where the graduations A–E respectively are aligned with the index 50, but also at an unlimited number of positions located between these particular five positions. The operator can provide not only the five positions where the graduations A–E are respectively aligned with the index 50, but also any desired position between these five positions, and in any one of this infinite number of positions the points of engagement of the portions 26 and 27 of the rings 28 and 29 with the cams 24 and 25 are predetermined so as to provide a selected program of exposure times and apertures. If, for example, the portion 26 of the ring 28 engages that portion of the cam 24 which is designated by the plane III, then the portion 27 of the ring 29 necessarily engages the ring 25 at that plane thereof which is designated IIIa in FIG. 1. Thus, the cams 25 and 24 are so constructed that for every possible axial position of the shaft 23 there will be provided during the following rotary movement of the shaft 23 different programs of the operation of the rings 28 and 29. The light-responsive means will turn the shaft 23 and the cams 24 and 25 to angular positions corresponding to the light value which corresponds to the given lighting conditions, and for every axial position of the shaft 23, and thus of the cams 24 and 25, there is for the entire range of light values a given program of exposure times and apertures which is different from the program at any other axial position of the cams 24 and 25. In spite of these different programs of combinations of exposure time and aperture, the settings of the exposure time and aperture will always be appropriate for the light value which is sensed by the light-responsive means and which is introduced by the angular turning of the shaft 23 and cams 24 and 25.

FIGS. 2–6 illustrate the curvatures of the cams 24 and 25 in several different planes, the curvatures being illustrated on an enlarged scale and for an embodiment of these cams where there will be automatic exposure control for exposure times ranging between 1/30 sec. and 1/250 sec. and for apertures which range between 2.8 and 16. The light values can therefore range between 8 and 16, with respect to a film whose speed is 18° DIN. Moreover, the entire range of adjustment takes place during turning of the shaft 23, and thus of the cams 24 and 25, through 90°.

Figure 2:
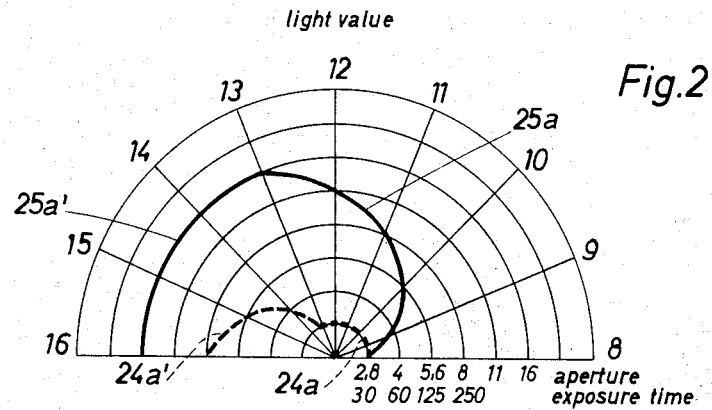

FIG. 2 shows the curvatures of the cams 24 and 25 in the planes II and IIa, designated in FIG. 1, while FIGS. 3–6 show the curvatures of the cams 24 and 25 in the additional planes III–VI and IIIa–VIa, designated in FIG. 1. In each of FIGS. 2–6 the dotted lines represents the curvature of the cam 24, while the solid line represents the curvature of the cam 25. Each of the circular arcs of FIGS. 2–6, provided to facilitate understanding of the cam structure, represents a given exposure time which will be provided by the cam 24 and a given aperture which will be provided by the cam 25, while the radial lines of FIGS. 2–6 represent the different light values which range from 8 to 16, as pointed out above.

FIG. 7 is a diagram which shows in a combined manner the changes of exposure time and aperture which will be provided upon actuation of the automatic light-responsive structure in the different axial positions represented in FIGS. 2–6, these axial positions being different axial positions of the shaft 23 and thus of the cams 24 and 25. The abcissa of FIG. 7 is graduated according to the exposure times, while the ordinate of FIG. 7 is provided with graduations according to the different apertures, and the several parallel diagonal lines of FIG. 7 indicate the various light values.

Referring now to FIG. 2, which represents the settings provided when the planes II and IIa of the cams 24 and 25 respectively engage the portions 26 and 27 of the rings 28 and 29, it will be seen that in this plane the cam 24 has a pair of portions 24a and 24a' of different curvatures. It will be seen from FIG. 2 that during angular turning of the cam 24 through the light values 8–13, the exposure time will remain constant at 1/30 sec., while beyond the light value 13, between this light value and the final light value 16, the curved portion 24a' will cooperate with the portion 26 of the ring 28 to adjust the exposure time from 1/30 to 1/250 sec., the shortest exposure time being attained at the largest light value 16, as is evident from FIG. 2. On the other hand, the cam 25 has at its portion which simultaneously engages the projection 27, the curved portions 25a and 25a', and it will be seen that during turning through the range of light values 8–13, the aperture will be reduced from 2.8 to 16 while from light value 13 all the way up to the light value 16 the smallest aperture 16 will be maintained without change. It will be seen that the line A in FIG. 7 illustrates the program of controls provided according to FIG. 2. Thus, starting from the upper left corner of FIG. 7 and moving downwardly along the line A it will be seen that the apertures decrease from 2.8 to 16 while the exposure time remains at 1/30 and the light values change from 8 to 13, while the horizontal portion of the line A extending from the left toward the right in FIG. 7 provides decreasing exposure times for the light values 14–16, and at this time the aperture remains constant at 16.

Figure 3:
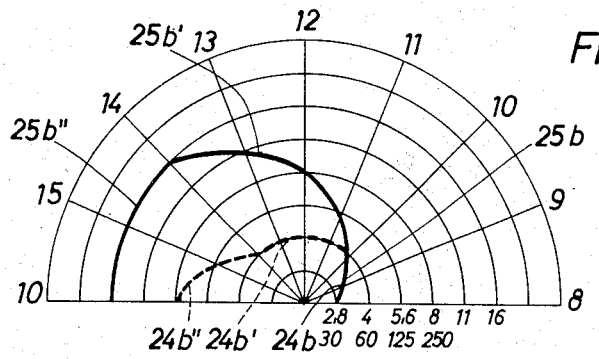

At the plane III, the cam 24 has the curvature illustrated in FIG. 3 from which it will be noted that the exposure time changes from 1/30 to 1/60 sec. during engagement of the portion 26 of the ring 28 with the cam portion 24b, and the exposure time remains constant at 1/60 sec. during engagement of the subsequent curved portion 24b' with the portion 26 of the ring 28, and during the engagement of the final portion 24b'' of the cam 24 with the ring 28 the exposure time changes from 1/60 to 1/250 sec. Thus, between the light values 8 and 10 the exposure time will change from 1/30 to 1/60 sec., while the exposure time will remain constant at 1/60 sec. between the light values 10 and 14, and between the light values 14 and 16 the exposure time will become further reduced from 1/60 to 1/250 sec. On the other hand, in the plane IIIa, the cam 25 has the portion 25b which is of the same curvature as the portion 24b, and then a subsequent portion 25b', followed by the final portion 25b". During the range of light values 8–14, the camming portions 25b and 25b' will change the aperture from 2.8 to 16, as indicated in FIG. 3 while between the light values 14 and 16 the camming portion 25b" will maintain the aperture at its smallest size 16. Actually the aperture changes from 2.8 to 4 by cooperation of the camming portion 25b with the ring 29, between the light values 8 and 10 in FIG. 3, while the camming portion 25b' changes the aperture from 4 to 16 between the light values 10 and 14. The program of FIG. 3 is illustrated by the line B in FIG. 7. Referring to FIG. 7 it will be seen that the line B extends diagonally across the upper left square of FIG. 7 from the upper left corner to the lower right corner thereof to provide a change of aperture from 2.8 to 4 while the exposure time changes from $1/30$ to $1/60$ sec., in the range of light values between 8 and 10, and then the line B extends straight down indicating that the exposure time remains constant at $1/60$ sec. while the aperture changes from 4 to 16, and the light values change from 10 to 14, and between the light values 14 and 16 the aperture remains at 16 while the exposure times decrease from $1/60$ to $1/250$ sec.

Figure 4:
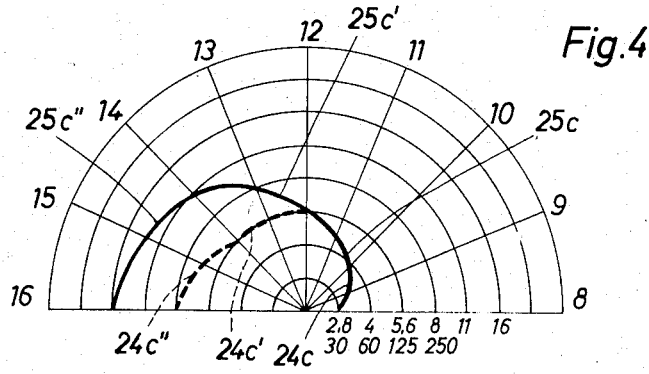

If the manually operable selecting means is actuated so as to place the shaft 23 and the cams 24 and 25 in an axial position where the planes IV and IVa of the cams 24 and 25 respectively engage the portions 26 and 27 of the rings 28 and 29, then the program illustrated in FIG. 4 will be provided by the illustrated curved portions of the cams 24 and 25. As may be seen from FIG. 4, the cam 24 has at the plane IV a portion 24c which between the light values 8 and 12 change the exposure time from $1/30$ to $1/125$ sec. The next portion 24c' of the cam 24 will maintain the exposure time unchanged at $1/125$ sec. between the light values 12 and 14, and the subsequent portion 24c" will reduce the exposure time from $1/125$ to $1/250$ sec. between the light values 14 and 16. The cam 25 in its plane IVa has a portion 25c which changes the aperture from 2.8 to 5.6 between the light values 8 and 12, and the intermediate portion 25c' of the cam 25 will further reduce the aperture from 5.6 to 11 between the light values 12 and 14, while between the light values 14 and 16, the succeeding portion 25c" of the cam 25 will reduce the aperture from 11 to 16. It will be noted that the curvatures 24c and 25c are identical, in the same way that the curvatures 24b and 25b of FIG. 3 are identical, and therefore these portions of the curves coincide in FIGS. 3 and 4. Moreover, it will be noted that the diaphragm is adjusted through two steps between the light values 8 and 12 by the camming portion 25c, while it is then adjusted through two additional steps between the light values 12 and 14 by the camming portion 25c' and then through the final step between the light values 14 and 16 by the camming portion 25c". This program which is provided with the structure shown in FIG. 4 is illustrated by the line C in FIG. 7. Thus, starting from the upper left corner of FIG. 7, and extending diagonally downward toward the right in FIG. 7, it will be seen that along the line C between the light values 8 and 12 the aperture changes from 2.8 to 5.6 while the exposure time changes from $1/30$ to $1/125$ sec., and then the vertical portion of the line C provides between the light values 12 and 14 a change in the diaphragm from 5.6 to 11 while the exposure time remains constant at $1/125$ sec., and then the line C extends diagonally downward toward the right through the lower right box of FIG. 7 to provide between the light values 14 and 16 a change in the diaphragm of between 11 and 16 while the exposure time changes from $1/125$ to $1/250$ sec.

At the planes V and Va, the cams 24 and 25 respectively have the curvatures illustrated in FIG. 5. As may be seen from FIG. 5, the cam 24 has in the plane V a portion 24d which through the range of light values 8–10 changes the exposure time from $1/30$ to $1/60$ sec., and then the cam 24 has a subsequent portion 24d' which changes the exposure time from $1/60$ to $1/250$ sec. between the light values 10 and 12, and between the light values 12 and 16 the exposure time is maintained constant at $1/250$ sec. by the camming portion 24d" in the plane V of the cam 24. In the plane Va, the cam 25 has a portion 25d of identical curvature with the portion 24d of the cam 24, and between the light values 8 and 10 the cam portion 25d will change the aperture from 2.8 to 4, and the subsequent portion 25d' of the cam 25, in the plane Va thereof, will maintain the aperture constant at 4 between the light values 10 and 12. The final curved portion 25d" of the cam 25 in the plane Va will reduce the aperture from 4 to 16 between the light values 12 and 16, as illustrated in FIG. 5. The structure shown in FIG. 5 is illustrated diagrammatically in FIG. 7 by the line D which extends diagonally across the upper left box of FIG. 7 from the upper left corner to the lower right corner thereof, indicating, between the light values 8 and 10, a change of aperture from 2.8 to 4, while the exposure time changes from $1/30$ to $1/60$ sec. Then the line D extends horizontally across the next two blocks, indicating between the light values 10 and 12 a constant aperture of 4, while the exposure time is reduced from $1/60$ to $1/250$ sec., and from the lower right corner of the upper right box of FIG. 7 the line D extends straight down to provide between the light values 12 and 16 a change of aperture from 4 to 16, while the exposure time remains constant at $1/250$ sec.

If the knob 48 is turned so as to locate the planes VI and VIa of the cams 24 and 25 respectively in engagement with the portions 26 and 27 of the rings 28 and 29, then the camming portions illustrated in FIG. 6 will control the exposure time and aperture. As may be seen from FIG. 6, the cam 24, in the plane VI, has a portion 24e which will reduce the exposure time from $1/30$ to $1/250$ sec. between the light values 8 and 11, and between the remaining light values 11 and 16, the camming portion 24e' will maintain the exposure time constant at $1/250$ sec. The cam 25, in the plane VIa, has a portion 25e which will maintain the aperture at 2.8 between the light values 8 and 11, and between the light values 11 and 16, a camming portion 25e' will reduce the aperture from 2.8 to 16. The program provided with the structure of FIG. 6 is illustrated by the line E in FIG. 7. Thus, as may be seen from FIG. 7, the line E starts at the upper left corner of FIG. 7 and extends horizontally across to the upper right corner of FIG. 7, maintaining the aperture at 2.8 while the exposure time changes from $1/30$ to $1/250$ sec., between the light values 8 and 11, and then the line E extends straight down along the righthand side of FIG. 7, maintaining, between the light values 11 and 16, the exposure time at $1/250$ sec., while the aperture changes from 2.8 to 16.

As was pointed out above, inasmuch as the cams 24 and 25 are three-dimensional cams with curvatures which gradually change between those described above, it is possible to position these cams at any desired location between the above-described specific locations, so that any one of an infinite number of possible programs of exposure time and aperture may be provided with the structure of the invention.

It will be noted that with the above-described structure of the invention, when the cams 24 and 25 move in one direction, the rotational or angular direction, in the illustrated example, a given program of exposure times and apertures will be provided during changing light values, while when the light value is maintained constant during movement of the cams 24 and 25 in the other, axial direction, the exposure time and aperture change inversely with respect to each other. Thus, as may be seen from a comparison of FIGS. 2–6, for any given light value the exposure time and aperture will change inversely with respect to each other through the several positions. For example, for the light value 12 in each of FIGS. 2–6, it will be seen that the aperture changes from 11 in FIG. 2 to 4 in FIG. 6, while the exposure time for the same light value changes from 1/30 sec. in FIG. 2 to 1/250 sec. in FIG. 6. In other words, for the light value 12 when progressing from the planes of FIG. 2 to those of FIG. 6, the aperture increases in size while the exposure time decreases, and an inverse relationship between the exposure time and aperture from one plane to the next during axial shifting of the cams will be provided at each of the light values, as may be seen from a comparison of FIGS. 2–6.

The invention is of course not limited to the details described above. For example, the curvatures of the three-dimensional cams 24 and 25 can be different from the particular curvatures described and shown above, the only requirement being that the curvatures of the two cams are so related to each other that at the portions thereof which are simultaneously engaged by the exposure time and diaphragm setting rings the relationship between the curvatures of the two cams is such that they will always provide aperture and exposure time which will correspond to the light value which is represented by the angular position of the shaft 23, and thus of the cams 24 and 25. Also, instead of providing an arrangement where springs continuously urge the projections of the rings 28 and 29 against the cams 24 and 25, it is possible to provide a structure where the rings 28 and 29 are more positively coupled to the cams so as to be moved thereby without requiring springs. For example, the projections 26 and 27 may have a bifurcated construction where the cam 24 is received in a cutout of a projection of the ring 28 with this cutout engaging the cam at opposite sides thereof so that the turning of the cam will in this way be transmitted positively to the ring. Thus, the projection of each ring 28 and 29 may take the form of an inverted U-shaped member between whose legs the cam is located so that as the cam turns it will shift the U-shaped member, and thus the ring connected thereto, in order to turn the ring. Moreover, although the two directions of movement in the illustrated example are axial and rotational directions of the shaft 23 and the cams 24 and 25, it is equally possible to produce the desired results with two other different directions of movement, such as, for example, moving the cams in translation in a pair of mutually perpendicular directions.

It will be understood that each of the elements described above or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteritsics of the generic or specific aspects of this invention and, therefore, such adaptations should and are intended to be comprehended within the meaning and range of equivalence of the following claims:

What is claimed and desired to be secured by Letters Patent is:

1. In a camera, in combination, a pair of three-dimensional cam means; exposure time-setting means actuated by one of said cam means for setting the exposure time; aperture-setting means actuated by the other of said cam means for setting the exposure aperture; automatic light-responsive means operatively connected to said pair of cam means for moving said pair of cam means automatically in one direction respectively to positions determined by the lighting conditions; and manually operable selecting means operatively connected to said pair of cam means for moving the same in another direction to a selected position in accordance with a selected program of exposure times and exposure apertures, whereby with said manually operable means it is possible to select one of a plurality of programs of exposure time and aperture while the automatic light-responsive means will automatically provide a combination of exposure time and aperture from the selected program which will provide a proper exposure for the prevailing lighting conditions.

2. In a camera, in combination, a pair of three-dimensional cam means; exposure time-setting means actuated by one of said cam means for setting the exposure time; aperture-setting means actuated by the other of said cam means for setting the exposure aperture; automatic light-responsive means operatively connected to said pair of cam means for moving said pair of cam means automatically in one direction respectively to positions determined by the lighting conditions; and manually operable selecting means operatively connected to said pair of cam means for moving the same in another direction to a selected position in accordance with a selected program of exposure times and exposure apertures, whereby with said manually operable means it is possible to select one of a plurality of programs of exposure time and aperture while the automatic light-responsive means will automatically provide a combination of exposure time and aperture from the selected program which will provide a proper exposure for the prevailing lighting conditions, the movement of said pair of cam means in said one direction by said automatic light-responsive means providing different light values in the actuation of the exposure time and aperture setting means by said pair of cam means while the movement of said pair of cam means in said other direction by said manually operable means maintains a given light value while changing the exposure aperture and exposure time inversely one with respect to the other.

3. In a camera, in combination, an elongated shaft; support means supporting said shaft for movement in an axial direction as well as for movement in a rotary direction; a pair of three-dimensional cams fixed to said shaft for axial and rotational movement therewith; aperture-setting means and exposure-time-setting means respectively actuated by said pair of cams; automatic light-responsive means operatively connected to said shaft for moving the same in one of said directions in accordance with the lighting conditions; and manually operable means operatively connected to said shaft for moving the same in the other of said directions to select a given program of combinations of exposure time and aperture.

4. In a camera, in combination, an elongated shaft; support means supporting said shaft for rotary movement and for axial movement; a pair of three-dimensional cams fixedly carried by said shaft for rotary and axial movement therewith; exposure-time-setting means and aperture-setting means respectively actuated by said cams for respectively setting the exposure time and aperture; automatic light-responsive means operatively connected to said shaft for turning the same to angular positions determined by the lighting conditions; and manually operable means operatively connected to said shaft for moving the same axially to a position providing a selected program of exposure times and apertures.

5. In a camera, in combination, a pair of three-dimensional cam means; an exposure time setting ring and an aperture setting ring respectively having projections engaging said pair of cam means; a pair of spring means respectively urging said projections of said rings against said pair of cam means, so that movement of the latter will actuate said pair of rings to set the exposure time and aperture, respectively; support means supporting said pair of cam means for movement in a pair of different directions; automatic light-responsive means operatively connected to said pair of cam means for moving the same in one of said pair of directions in accordance with lighting conditions; and manually operable selecting means operatively connected to said pair of cam means for moving the same in the other of said pair of directions in accordance with a selected program of exposure times and apertures.

6. In a camera, in combination, an elongated shaft; support means supporting said shaft for axial and rotational movement; a pair of three-dimensional cams fixedly carried by said shaft for rotational and axial movement therewith; exposure time setting means and aperture setting means respectively actuated by said pair of cams; automatic light-responsive means operatively connected to said shaft for rotating the same to move said pair of cams for actuating said exposure time setting means and aperture setting means in accordance with the lighting conditions; a pair of flanges located adjacent each other and fixedly carried by said shaft; a pin extending between said flanges; a lever carrying said pin and supported for turning movement by said support means; and manually operable means operatively connected to said lever for turning the same so as to axially move said shaft to provide a selected program of exposure times and apertures.

7. In a camera, as recited in claim 6, said lever being a two-armed lever one arm of which carries said pin and the other arm of which is formed with an elongated cutout, and said manually operable means including a rotary member carrying a pin which is located in said elongated cutout so that when said rotary member is manually turned said lever will be turned for axially moving said shaft.

8. In a camera as recited in claim 7, said rotary member being in the form of a gear and said manually operable means including another gear meshing with said rotary member and fixedly connected with a handle which is accessible to the operator for turning said gears so as to turn said lever.

9. In a camera, in combination, an elongated shaft extending parallel to the optical axis; support means supporting said shaft for movement in a rotational direction and for movement in an axial direction; a pair of three-dimensional cams fixedly carried by said shaft for movement therewith in said direction; an exposure time setting ring and an aperture setting ring respectively having projecting portions engaging said pair of cam to be respectively actuated thereby, said rings respectively extending along circles whose centers are in the optical axis; automatic light-responsive means operatively connected to said shaft for moving the same in one of said directions; and manually operable selecting means operatively connected to said shaft for moving the same in the other of said directions for selecting a given program of exposure time and apertures.

10. In a camera as recited in claim 9, said automatic light-responsive means moving said shaft in said rotational direction and including a scanning member for scanning the position of a pointer of a light meter of the automatic light-responsive means, said scanning member fixedly carrying a rack for movement therewith, said shaft fixedly carrying a gear and said rack being operatively connected to said gear for rotating the latter and thus turning said shaft, said gear having a length which maintains the operative connection between said scanning member and said shaft irrespective of the axial position to which said shaft is moved by said manually operable selecting means.

References Cited in the file of this patent
UNITED STATES PATENTS

| | | |
|---|---|---|
| 2,999,437 | Hahn | Sept. 12, 1961 |
| 3,000,282 | Noack | Sept. 19, 1961 |
| 3,009,403 | Heerklotz | Nov. 21, 1961 |